United States Patent
Thompson et al.

[11] 3,726,346
[45] Apr. 10, 1973

[54] IMPLEMENT HITCH

[76] Inventors: William H. Thompson; Donnie H. Thompson, both of Route 2, Box 122; Kent B. Thompson, Route 2, Box 57, all of Harlingen, Tex. 78550

[22] Filed: Feb. 10, 1971

[21] Appl. No.: 114,190

[52] U.S. Cl. ............172/292, 172/446, 172/776
[51] Int. Cl. ............................................A01b 59/43
[58] Field of Search............172/439, 446, 476, 172/479, 272, 245, 248, 605, 677, 679, 685, 691, 741, 746, 776; 280/415

[56] References Cited

UNITED STATES PATENTS

| 2,979,137 | 4/1961 | Hess | 172/272 |
| 3,578,090 | 5/1971 | Cline | 172/699 X |
| 3,472,528 | 10/1969 | Richey et al. | 172/248 X |
| 3,195,651 | 7/1965 | Todd | 172/272 |
| 3,091,299 | 5/1963 | Truelove | 172/776 X |

Primary Examiner—Robert E. Pulfrey
Assistant Examiner—Stephen C. Pellegrino
Attorney—Ben Cohen

[57] ABSTRACT

The invention consists of an implement hitch designed for use with existing standard farm tractor hitches for plowing wherein the present hitch is used to convert one form of plowing operation to another by converting conventional manual operation to a substantially automatic operation saving considerable labor and time.

6 Claims, 5 Drawing Figures

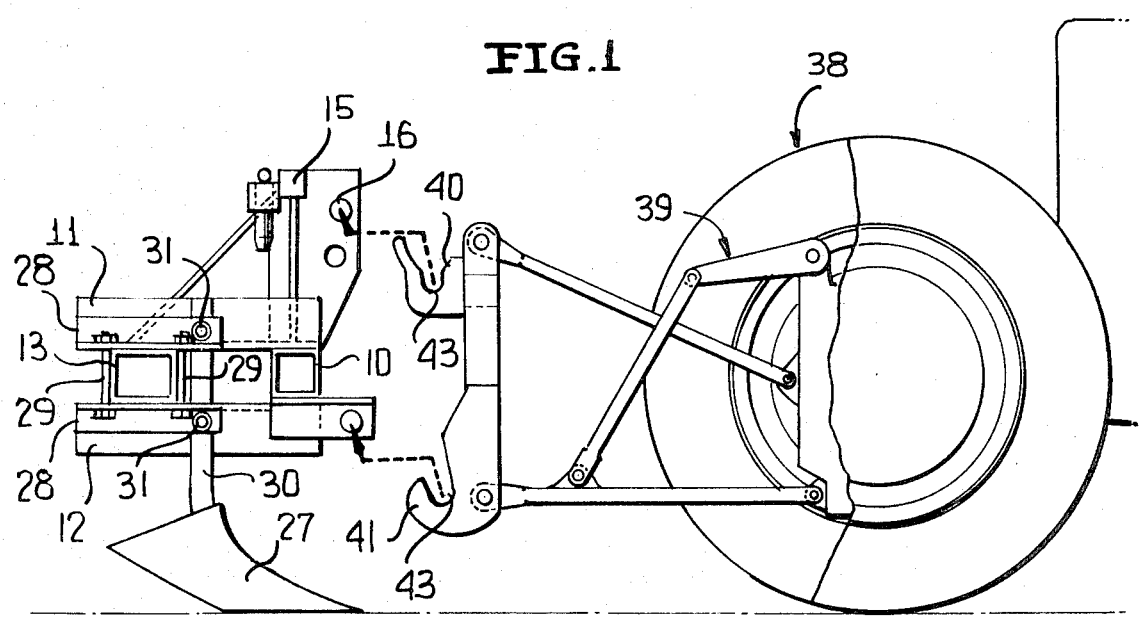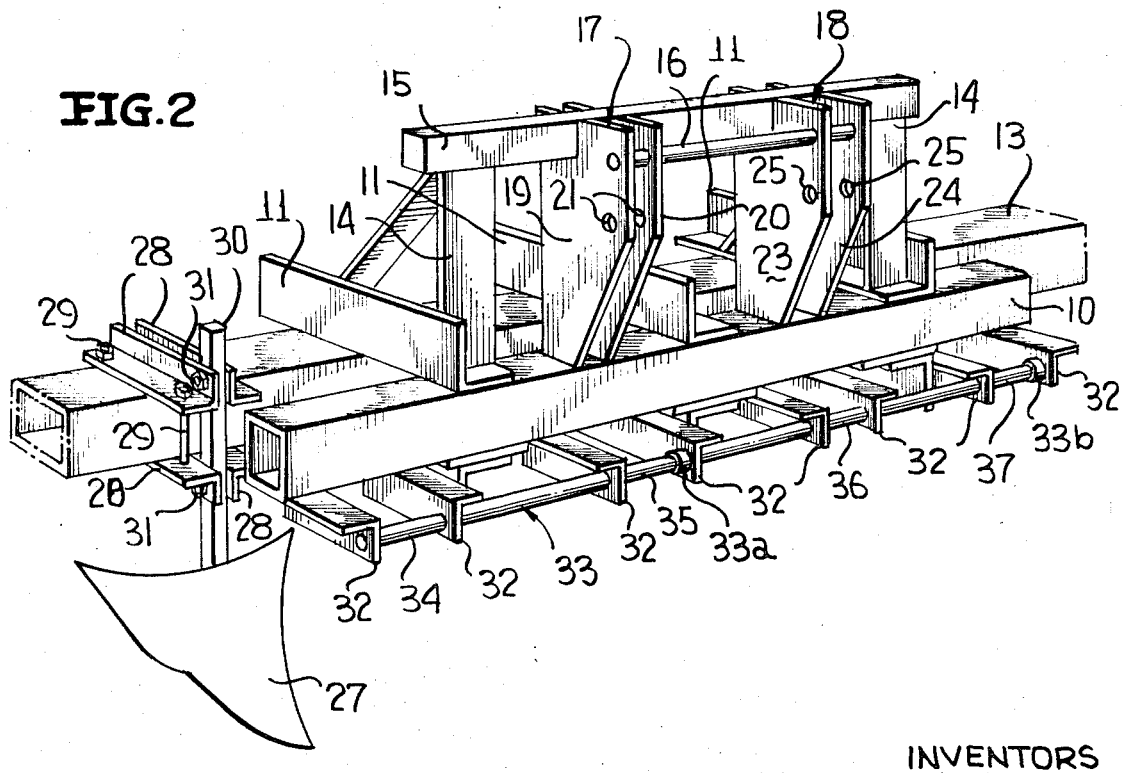

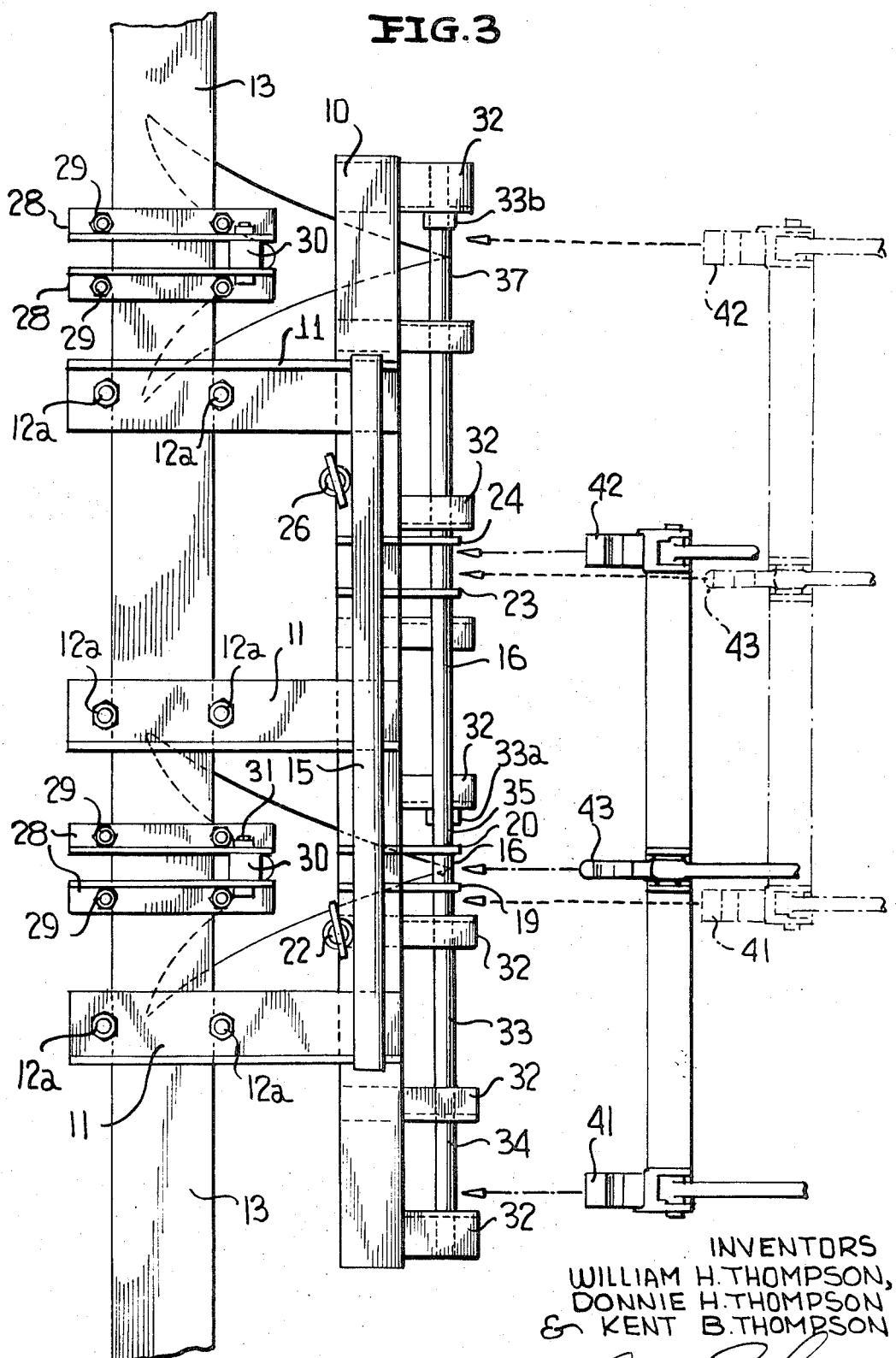

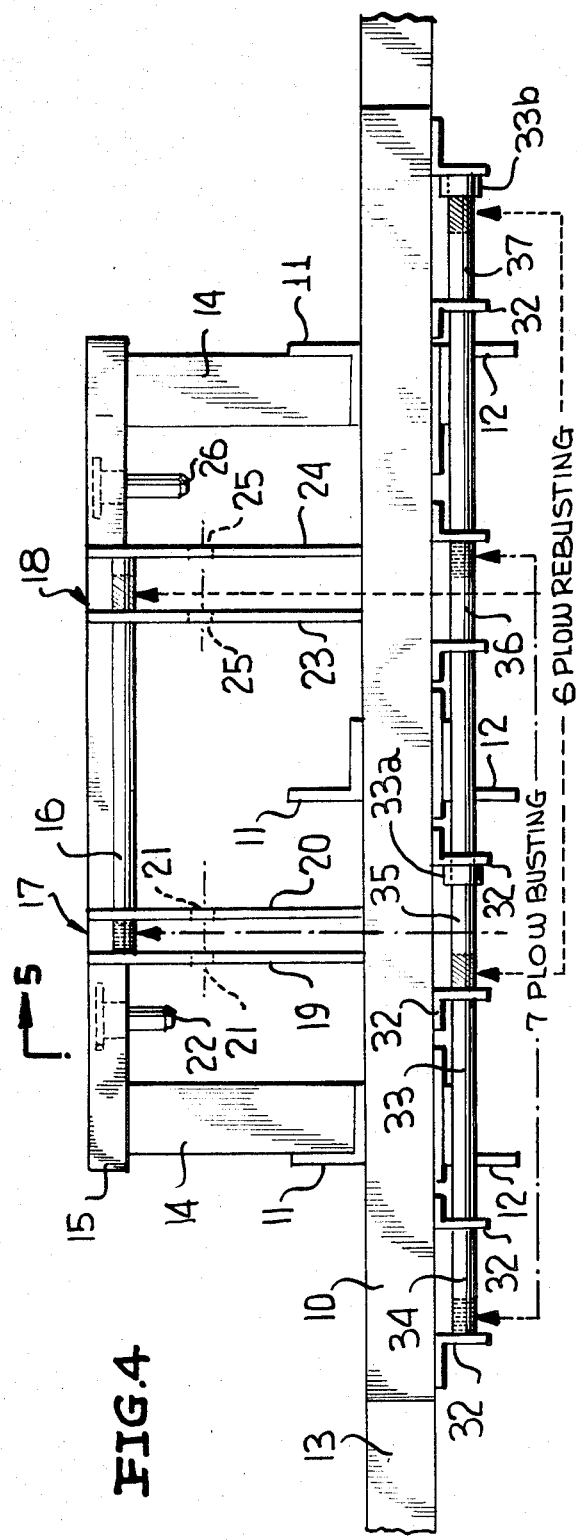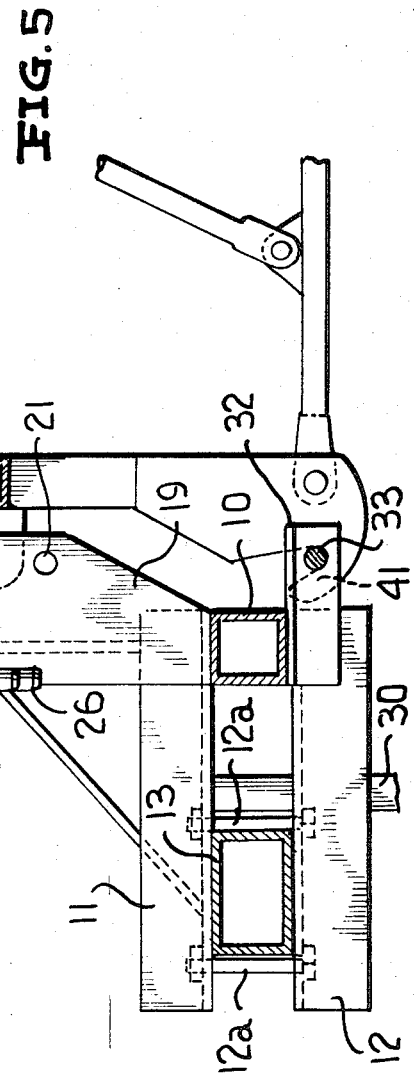

IMPLEMENT HITCH

BACKGROUND OF THE INVENTION

It is customary in plowing operations to convert a plowing device from plowing middles to re-busting operations. Present method of converting from plowing middles to re-busting is to loosen or remove all plows from the tool bar and precisely remount them exactly one-half row over from their previous position. This requires a considerable amount of manual labor and a considerable amount of time. The present construction is designed to eliminate most of the manual labor and more than eighty percent of the time consumed.

SUMMARY OF THE INVENTION

The present invention involves a novel farm implement hitch whereby a hitch can be converted from four, six, eight, etc., row bedding to running middles in five, seven, nine, etc., rows, thus making two implements in one. The arrangement is such that the tractor can be connected to the implement hitch in such manner as to render the conversion automatic depending on the positioning of the tractor to the hitch and merely adding or removing a single plow. Also, the construction is such as to adapt the hitch to 38-inch or 40-inch rows for which most busting is done. It is also adaptable to tractors with category 2 or category 3 hitches.

BRIEF DESCRIPTION OF THE DRAWING

FIG. 1 is a side view of the present hitch and a tractor before assembly of the two;

FIG. 2 is a perspective view of the present hitch;

FIG. 3 is a plan view of the present hitch and a portion of the tractor prior to assembly of the two;

FIG. 4 is a front view of the present hitch; and

FIG. 5 is a side view of the present hitch and a portion of the tractor in assembled position.

DESCRIPTION OF THE PREFERRED EMBODIMENT

Referring to the drawings in detail, the present implement hitch arrangement comprises a framework consisting of a main horizontal support beam 10 in the form of a rigid hollow structural member of square cross section. Welded to the upper surface of beam 10 and extending at right angles thereto are three angle irons 11. Similar angle irons 12 are welded to the lower surface of beam 10 in the same planes as angle irons 11. Thus, opposed upper and lower angle irons 11 and 12 support between them a tool bar 13 which is parallel and spaced from beam 10, and to which tool bar the plows are secured in a manner to be described below. Vertical plates 14 are rigidly secured to the outside upper angle irons 11 and to an upper beam 15. Slightly spaced from upper beam 15 is a bar 16 supported by a pair of spaced vertical columns 17 and 18. Column 17 is formed of two spaced flanges 19 and 20 spaced approximately two inches apart. The spaced flanges 19 and 20 are provided with openings 21 to receive a pin 22 for a purpose to be described. Column 18 is formed of spaced flanges 23 and 24 spaced approximately 3 inches apart and provided with openings 25 to receive a pin 26 for a purpose to be described.

The tool bar 13 to which the plows 27 are secured is mounted between angle irons 11 and 12 and locked in position by bolts 12a as clearly shown in FIGS. 3 and 5. The plows 27 having a vertical rod section 30 are secured to the tool bar 13 by means of suitable pairs of angle irons 28 and vertical bolts 29 and additional horizongal bolts 31.

Mounted below the main beam 10 by a plurality of angle irons 32 is a lower support rod 33. The angle irons 32 are spaced apart to form areas 34, 35, 36 and 37 for a purpose to be described. Also mounted on support rod 33 are a pair of one-inch collars 33a and 33b as shown in FIG. 2 for a purpose that will appear as the description proceeds.

As seen in FIGS. 1 and 3, the present implement hitch as described above is designed for use with existing tractors having a power operated three-point hitch, in which the tractor carries upper and lower vertically and laterally swinging hitch links, the rear ends of which are adapted to be connected with any one of a number of different available implements, and in which power means is provided for raising and lowering the links to raise and lower the implement associated therewith. The tractor generally indicated by numeral 38 includes a power lift mechanism 39 for raising the upper arm 40 and the two lower arms 41 and 42, said arms being provided with conventional hook portions 43 to cooperate with the implements to be connected with the tractor.

The operation of the present hitch arrangement is as follows:

Present methods of converting from plowing middles to re-busting is to loosen or remove all plows from the tool and bar and precisely remount them exactly one-half row width over from their previous positions. Most busting is done with 38-inch or 40-inch rows for which the present hitch is designed. Although not shown in detail, there are five, seven, or nine, etc., plows mounted 38 inches apart on the tool bar with the center plow aligned with vertical support column 17. In this position, the plows are ready for plowing the middles (furrows). A conventional tractor is backed up to the present hitch with the top hook 43 engaging rod 16 between the flanges 19 and 20, and the bottom hooks 41 and 42 engaging rod 33 with hook 41 engaging against the first angle iron 32 on the left as viewed in FIG. 3 and hook 42 abutting the angle iron 32 to the right of area 36. Now when the hitch is raised, the unit is locked in position and ready for plowing.

When busting or rebusting (plowing the beds) is necessary, the tractor hitch is disengaged from the present hitch and the tractor is merely maneuvered over and re-engaged to the second position of the present implement hitch. This lateral movement is 19 inches or one-half of the 38-inch row.

In the new position, the hook 43 engages rod 16 between upright flanges 23 and 24. The two bottom hooks 41 and 42 engage 33 in the areas 35 and 37 with hook 41 abutting the left angle iron of area 35 and the hook 42 engaging against collar 33b. In this position the tractor hitch has moved over a distance of 19 inches on the present implement hitch. One plow is removed from the tool bar and the implement is ready for the re-busting operation.

For 40-inch rows, the plows are mounted on the tool bar 40 inches apart. The first engagement of the tractor hitch with the implement hitch is the same as described above. Now however, for re-busting, the tractor hitch must move over 20 inches to the right. This is done by moving the 1-inch collars 33a and 33b to the left of areas 35 and 37. The left hook 41 fits snug against collar 33a and the right hook 42 fits snug against the right hand angle iron 32 of area 37. The upper hook 43 engages rod 16 between upright flanges 23 and 24. These flanges are 3 inches apart thereby allowing the hook to move the extra inch. Now everything is ready for re-busting 40-inch rows after one plow is removed.

In order to accommodate the standard type tractor coupler hitch, which is slightly smaller than the tractor hitch described above, slight adjustments must be made since the vertical distance between the lower hooks and the upper hook is less, but also the horizontal distance between the lower hooks is less. To accommodate the vertical adjustment, the pin 22 is inserted in openings 21 and the pin 26 is received in openings 25, said pins receiving the upper hook 43 for the middle plowing operation and for the re-busting operation as previously described. With respect to the lesser distance between the lower hooks, in running middles, hook 41 engages bar 33 abutting angle iron 32 on right side of area 34. Hook 42 engages bar 33 abutting angle iron 32 on left side of area 36. In the busting operation, hook 41 engages bar 33 abutting collar 33a to a right of area for 38-inch rows. For 40-inch rows, hook 41 engages bar 33 abutting angle iron 32 on right side of area 35. Hook 42 engages bar 33 abutting angle iron 32 to left side of area 37 for 38-inch rows. For 40-inch rows, hook 42 engages bar 33 abutting collar 33b which in turn is slid to left of area 37 abutting angle iron 32.

Having thus described the invention, what is claimed is:

1. In a hitch mechanism adapted to connect a tractor having upper and lower hitch links and power lift means connected to raise and lower said links with an implement hitch having upper and lower connections, said hitch comprising a framework consisting of a main horizontal support beam, a tool bar connected to said beam and adapted to support a plurality of plows, an upper beam supported by said main beam, a support rod below said main beam and connected thereto, an upper bar mounted above the main beam and below said upper beam, said bars adapted to be detachably connected to the upper and lower hitch links of the aforementioned tractor, means on said bars for defining zones formed along said upper and lower bars and means on said bars to confine the tractor links within said zones whereby the tractor links are positioned along several desired points on said bars to vary the transverse position of said implement hitch with respect to the tractor.

2. An implement hitch as defined in claim 1, a plurality of collars mounted on the lower bar for varying the position of the tractor links with respect to the implement hitch.

3. An implement hitch as defined in claim 1, a pair of transverse pins adapted to be mounted below the upper bar for receiving the upper link of a tractor.

4. An implement hitch as defined in claim 1, said plows being transversely spaced and detachably connected to said tool bar.

5. An implement hitch as defined in claim 4, a plurality of collars mounted on the lower bar for further varying the position of the tractor links with respect to the implement hitch.

6. An implement hitch as defined in claim 5, a pair of transverse pins adapted to be mounted below the upper bar for receiving the upper link of a tractor.

* * * * *